May 11, 1954

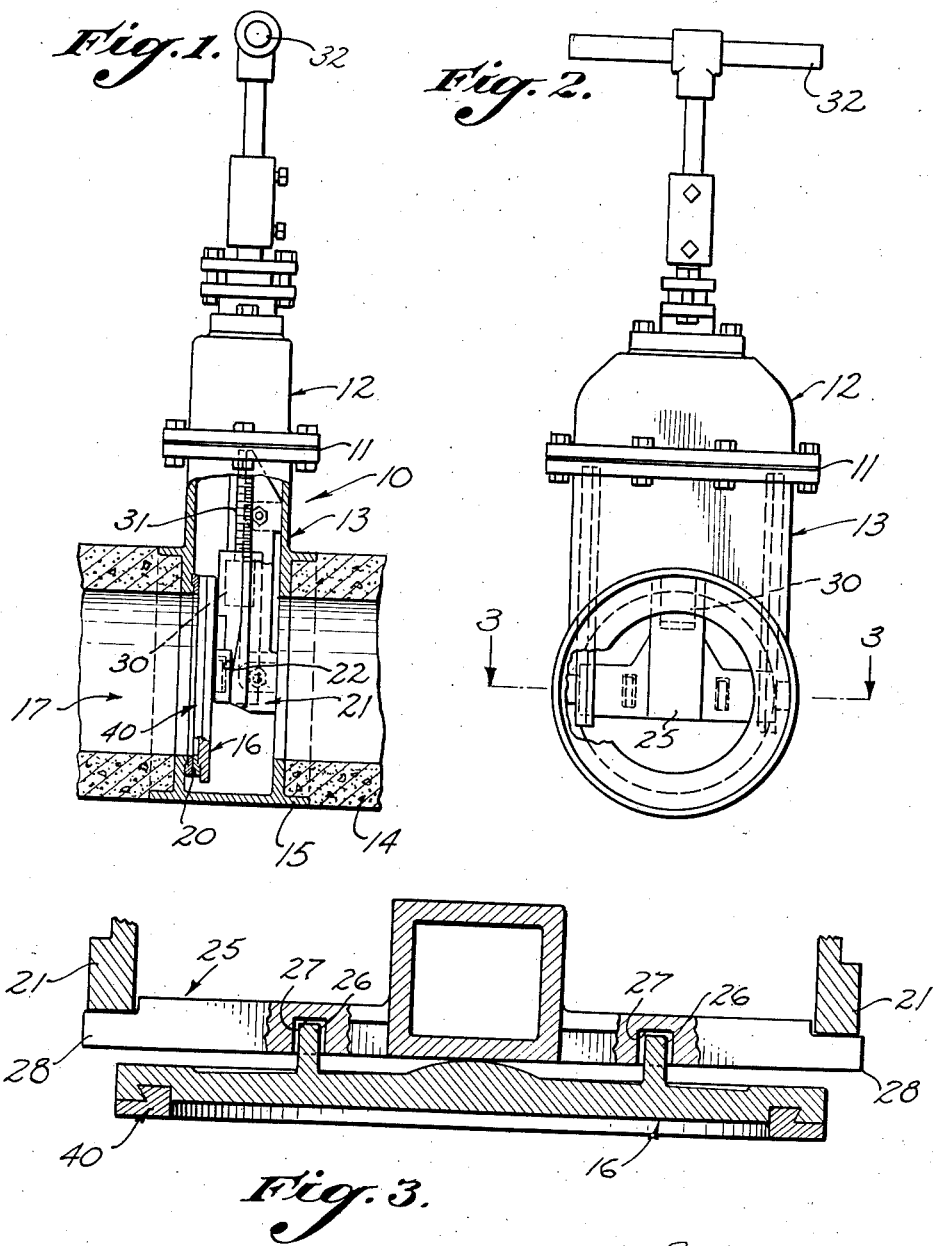

R. E. JUHNKE ET AL

METHOD OF FABRICATING A VALVE MEMBER HAVING
A BODY AND SEAT OF DIFFERENT METALS

Filed Sept. 26, 1949

ROY E. JUHNKE
GEORGE CASTERA
INVENTOR.

BY *Robert M. Fulwider*

ATTORNEY

Patented May 11, 1954

2,677,876

UNITED STATES PATENT OFFICE 2,677,876

METHOD OF FABRICATING A VALVE MEMBER HAVING A BODY AND SEAT OF DIFFERENT METALS

Roy E. Juhnke and George Castera, Los Angeles, Calif., assignors to Bardco Manufacturing & Sales Company, Los Angeles, Calif., a corporation of California Application September 26, 1949, Serial No. 117,912

1 Claim. (Cl. 29—157.1)

This invention relates generally to heterogeneous cast articles having adjoining portions of dissimilar metals, and more particularly, to a gate valve in which the gate proper is constructed of one metal and a seat or bearing ring integrally cast therewith is formed of a different metal.

While the casting process embodying our invention is of particular value in the fabrication of valves and similar fixtures, it will be realized that the process is adaptable to produce many other heterogeneous articles. Likewise, the novel valve gate hereinafter to be described may be employed in structures other than valves, e. g., for pump cylinder heads, manhole or inspection plates in boilers, and other applications. Accordingly, it is to be understood that the field of use of our invention is not limited to the specific embodiment herein described in detail, as illustrative of one embodiment of the invention.

In the construction of valves and other fixtures for irrigation water mains and the like, cast iron is a desirable material for most of the structural members because of its relatively low cost, its ease of machining, strength, and its excellent casting properties. In one particular portion of such structures and the like, cast iron is not, however, entirely suitable. This portion is the peripheral edge of a gate and the seat against which the gate contacts when closed.

In order to achieve a relatively closely fitting valve, it is necessary that the valve seat and the contacting edge of the valve be fairly closely machined so as to make a tight sliding fit with each other, and it is also desirable that these contacting surfaces be relatively non-corrosive so that such close fit is maintained after extended use. Because of the fact that cast iron is subject to rusting, particularly on surfaces thereof which have been machined, it has been the previous practice in constructing gate valves and the like to secure to the contacting surfaces strips of brass, bronze, or other relatively non-corrosive material. Such strips are usually secured by bolting them to the valve proper or securing them by pins, rivets, or other attachment members.

The disadvantage of this procedure is that it requires a number of additional machining operations to produce closely fitting contact surfaces between the valve seat and the member to which it is attached and is also somewhat unsatisfactory in that it produces additional machined surfaces in the cast iron which are more susceptible to corrosion than the unmachined surfaces of such materials.

Bearing in mind the foregoing practice, it is a general object of the present invention to produce manufactured articles having portions of dissimilar cast metals which are integrally secured together during the casting operation.

It is a more specific object of the present invention to provide in a valve structure of the general class described, a relatively non-corrosive valve seat which is secured to the body portions of the valve during the casting operations in which the latter are produced.

It is another object of the invention to produce a pressure plate such, e. g., as a valve gate or cylinder head, which is constructed principally of a first metal having a bearing ring of a dissimilar second metal embedded therein.

It is still another object of the invention to provide a method for casting articles of the class above described.

A further object of the invention is to provide in a gate valve, a seat structure in which the seat is hermetically bonded to the body portion.

A still further object of the invention is to provide a method for sealing valve structures of the class above described.

The foregoing and additional objects and advantages of the invention will appear from the following description thereof, consideration being given likewise to the attached drawings in which:

Figure 1 is a partially sectioned side elevational view of a gate valve which includes portions embodying the present invention;

Figure 2 is an end elevational view of the valve illustrated in Figure 1, portions of the structure being broken away to reveal underlying parts;

Figure 3 is a horizontal enlarged section taken on the line 3—3 in Figure 2;

Figure 4:
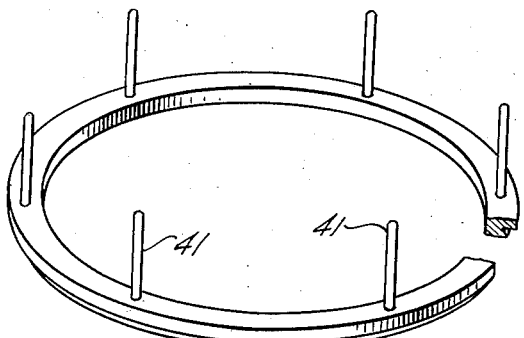
Figure 4 is a perspective view partially sectioned, showing a valve seat of the type incorporated in Figure 1 prior to its attachment to the body portions.

Referring particularly to Figure 1, it will be seen that the gate valve embodying the present invention includes a valve body 10 divided along a horizontal joint 11 into an upper body section 12 and a lower body section 13. The lower body section 13 is secured in a concrete irrigation pipe 14, either by casting the concrete pipe directly in place around attachment flanges 15 or placing the pipe 14 in contact with the valve body 13 and grouting the joints.

Within the lower body section 13 in the position illustrated in Figure 1 is a flow controlling gate 16, shown in closed position in Figure 1, which may be raised into the upper portion of the valve 10 to open an unrestricted longitudinal passage 17 through the valve. When the valve 10 is in its closed position, illustrated in Figure 1, the gate 16 is not only lowered to its lowermost position therein but is thrust against a valve seat 20 which is integrally formed in the lower body section 13. This axial thrust (to the left in Figure 1) is accomplished by means of a pair of tracks 21 which are cast in the body section 13 or otherwise secured therein, the tracks 21 having outwardly tapered terminal sections 22 at the lower ends thereof.

The gate 16 is carried in a carriage 25 by means of rearwardly projecting lugs 26 formed in the gate 16 and relatively loosely received in a pair of sockets 27 formed in the carriage 25. Outwardly projecting lugs 28 are formed in the carriage 25 and engaged with the tracks 21 so that as the carriage 25 moves downwardly, the tapered portions 22 on the track 21 force the carriage 25 sideways to thrust the gate 16 tightly against its seat 20. Upward and downward movement of the carriage 25 and the gate 16 carried thereby is accomplished by means of a lead nut 30, mounted in the carriage 25 as shown in Figure 2, which lead nut 30 is engaged with a vertical lead screw 31 journaled in the upper body section 12. The lead screw 31 is provided with a T-handle 32 by which it may be rotated in one direction or another to raise or lower the carriage 25 and the seat 16 carried thereby.

It is desirable that the valve gate 16 have a relatively close fit against its seat 20. To this end, the seat 20 is constructed of cast bronze which may be machined to form a flat, non-corrosive, contact surface, and the valve gate 16 is similarly provided with a cast bronze bearing ring 40 which is cast in place.

While in the presently preferred embodiment of the invention, the material of the valve body section 13 and the gate 16 is cast iron, and while the seat 20 and the bearing ring 40 are cast bronze, it will be realized that other materials may be employed without departing from the spirit of the present invention. Both the seat 20 and the bearing ring 40 are formed with a reentrantly shaped annular key or locking portion 46 (see Figure 5) which has a dovetail cross-section.

For a discussion of the procedure by which the seat 20 and the bearing ring 40 are secured in place, reference should now be had to Figures 4 through 7, wherein the steps of producing the gate 16 are illustrated. The procedural steps in securing the valve seat 20 in place are substantially the same as those used in fabricating the gate 16 wherefore a description of the construction of the latter will serve to illustrate both processes.

The first step in producing the gate 16 is to cast the bearing ring 40 by conventional casting methods, the ring 40 being formed with integrally cast upwardly projecting prong-like members 41, the purpose of which will hereinafter be described.

Figure 5:
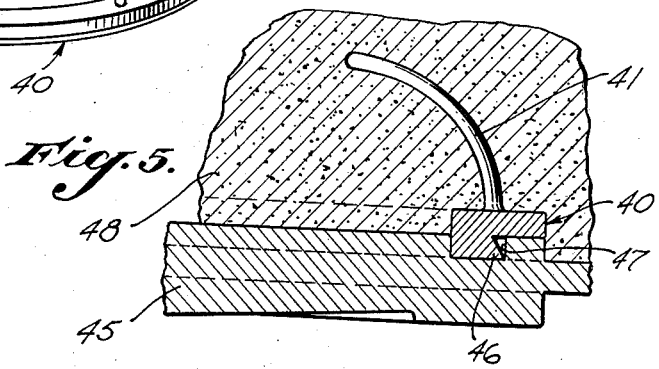
Figure 5 is an elevational section taken through a valve seat, core, and match plate, illustrating one of the steps of securing a valve seat of the type shown in Figure 4 to the cast body of a valve.

After the casting of the articles shown in Figure 4, the prongs 41 are bent inwardly as illustrated in Figure 5, whereby to lock the rings 40 into a baked core and also prevent distortion of the ring when the same is brought into contact with molten iron during the casting process about to be described.

After the prongs 41 have been bent inwardly, as illustrated in Figure 5, the same is placed against the upper surface of a match plate 45, the dovetail locking portion 46 of the ring 40 being received in an annular groove 47 in the pattern on the upper or cope surface of the match plate 45. Conventional baked core material 48 is rammed in place against the upper surface of the match plate 45 and is thereafter baked to form a solid core with the ring 40 embedded therein. The baked core material 48 is used in sufficient quantity to fill an entire cope section 50 of a conventional founding flask, and conventional pouring sprues 49 are formed in the core 48.

Figure 6:
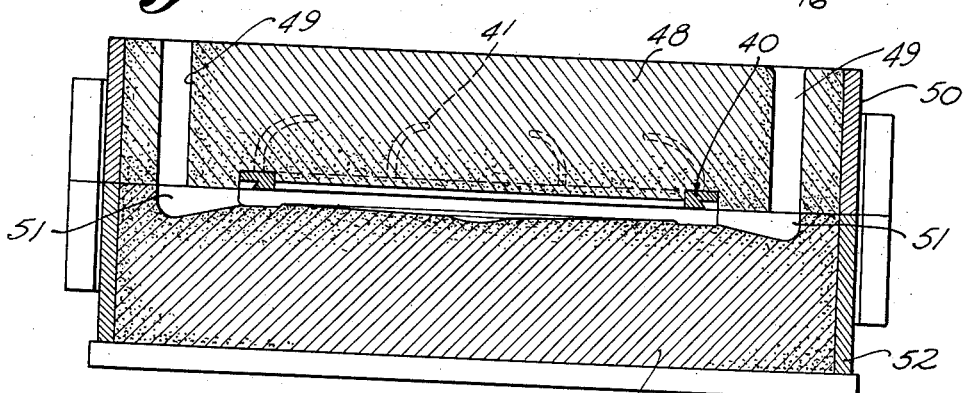
Figure 6 is an elevational section taken through a mold prior to the pouring of a valve gate to secure the same to the seat illustrated in Figures 4 and 5.

The drag section 52 of the flask corresponding to the cope section 50 is rammed up against the underside of the match plate 45, using green sand 53. Pouring gates 51 are formed in the drag in alignment with the pouring sprues 49. The cope 50 and the drag 52 are then assembled as illustrated in Figure 6, and molten iron is poured into the sprue openings 49 and flows inwardly, filling the mold cavity in contact with the bearing ring 40, embedded in the core 48. By reason of the dovetail shape of the locking portion 46 of the ring 40, the latter is firmly embedded and locked into the iron gate 16 when the latter solidifies. During the solidifying of the iron gate 16, the ring 40 acts somewhat in the nature of a chill, thus preventing the iron from fusing the ring, but nevertheless effecting a tight interlocking connection between the gate 16 and the ring 40.

After the gate 16 is solidified, it is removed from the mold and the core material 48 broken away, whereupon the pouring gates 51 are cut off, and the upper or contact surface 55 (see Figure 7) of the ring 40 is machined smooth, removing the prongs 41.

Figure 7:
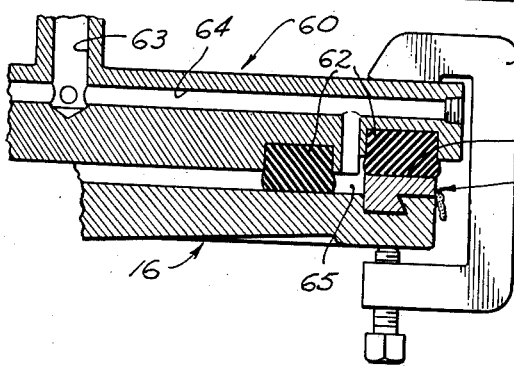
Figure 7 is an elevational section taken through a fixture employed in hermetically sealing the joint between the valve seat and gate.

In some instances, it is necessary to provide further sealing means between the gate 16 and the ring 40 to prevent the escape of fluid through the joint between these two parts. This further sealing procedure is illustrated in Figure 7, wherein it will be seen that a sealant fixture 60 is secured to the gate 16 by means of a number of C-clamps 61. The fixture 60 is in the form of a disc substantially equal in diameter to that of the gate 16, and is provided on its lower surface with a pair of relatively soft rubber sealing gaskets 62, one of which contacts the machined surface 55 of the bearing ring 40 and the other of which contacts the surface of the gate 16 itself at a point spaced inwardly from the ring 40. A central fluid-introducing passage 63 is formed in the fixture 60 and communicated by a number of radial passages 64 with an annular space 65 between the two sealing gaskets 62. Thus, fluid introduced under pressure through the passage 63 passes outwardly through the radial passages 64 into the annular space 65 and can escape therefrom only through the joint between the gate 16 and the ring 40. Accordingly, fluid sealant, which may be any one of a number of viscous, resinous materials, is introduced through the passages 63 and 64 under pressure and is thus forced out through the joint. When the gate 16 is thereafter removed from the fixture, such material as has been forced into the joint hardens, and forms a hermetic seal therein.

In the present instance, the sealant used is liquid phenolic resin which is introduced at a pressure of approximately one hundred pounds per square inch. To further enhance the sealing action, it has been found that the assembled gate and ring may be preheated to between 200° and 250° Fahrenheit, thus making the passage of fluid therethrough easier by reason of the reduced viscosity thereof, and also having the effect of slightly enlarging the space in the joint between the gate 16 and the ring 40. After the resin has polymerized to form a tight hermetic seal, the excess which escapes around the edge of the gate 16 may be removed and the gate is ready for use.

As above stated, the steps of the process used in securing the seat 20 to the lower body section 13 are substantially identical to those employed in securing the gate 16 and the ring 40 together.

While the method and valve structure shown in the drawings and described herein are fully capable of achieving the objects and providing the advantages hereinbefore stated, it will be realized that they are capable of considerable modification without departing from the spirit of the invention. For this reason, we do not mean to be limited to the forms shown and described, but rather to the scope of the appended claim.

We claim:

A process for casting heterogeneous valve members which comprises the steps of: casting a bronze ring having support projections on one surface and an annular reentrantly shaped key portion on an opposite surface; placing said ring against the cope surface of a founding pattern for a valve member with said first surface of said ring away from said pattern; ramming up a core sand, cope section of a casting mold against said pattern and ring to embed the same in said cope section; ramming up a green sand drag section of a casting mold against the drag surface of said pattern; removing said pattern from said mold sections to leave a cavity therein with said key portion projecting thereinto; baking said cope section to form a solid mold section with said ring partially embedded therein; assembling said cope and drag sections; pouring molten iron into said cavity to fill the same; cooling said iron to form a valve member with said ring embedded therein; removing said member from said mold; machining said projections from said ring to form a smooth bearing surface; preheating said member to a temperature between 200° and 250° Fahrenheit; forcing liquid phenolic resin into the joint between said bronze and iron; and polymerizing said resin to seal said joint.

References Cited in the file of this patent

UNITED STATES PATENTS

| Number | Name | Date |
|---|---|---|
| Re. 9,142 | Strehli | Apr. 6, 1880 |
| 316,588 | Weber | Apr. 28, 1885 |
| 362,059 | Campbell | May 3, 1887 |
| 476,313 | Richards | June 7, 1892 |
| 496,136 | Richards | Apr. 25, 1893 |
| 709,491 | Kennedy | Sept. 23, 1902 |
| 1,103,591 | Kneass | July 14, 1914 |
| 1,390,750 | Bell | Sept. 13, 1921 |
| 1,729,747 | Palm | Oct. 1, 1929 |
| 1,895,219 | Begtrup | Jan. 24, 1933 |
| 2,157,453 | Jaeger | May 9, 1939 |
| 2,220,210 | Chace | Nov. 5, 1940 |
| 2,255,184 | Osenberg | Sept. 9, 1941 |
| 2,242,441 | Shoemaker et al. | May 20, 1941 |
| 2,290,249 | Piperoux | July 21, 1942 |
| 2,312,579 | O'Brien | Mar. 2, 1943 |
| 2,482,841 | Cooper | Sept. 27, 1949 |
| 2,483,056 | Leckie | Sept. 27, 1949 |